March 28, 1961  F. M. IRWIN  2,976,954
COMPRESSED AIR PURIFIER
Filed June 4, 1959  2 Sheets-Sheet 1
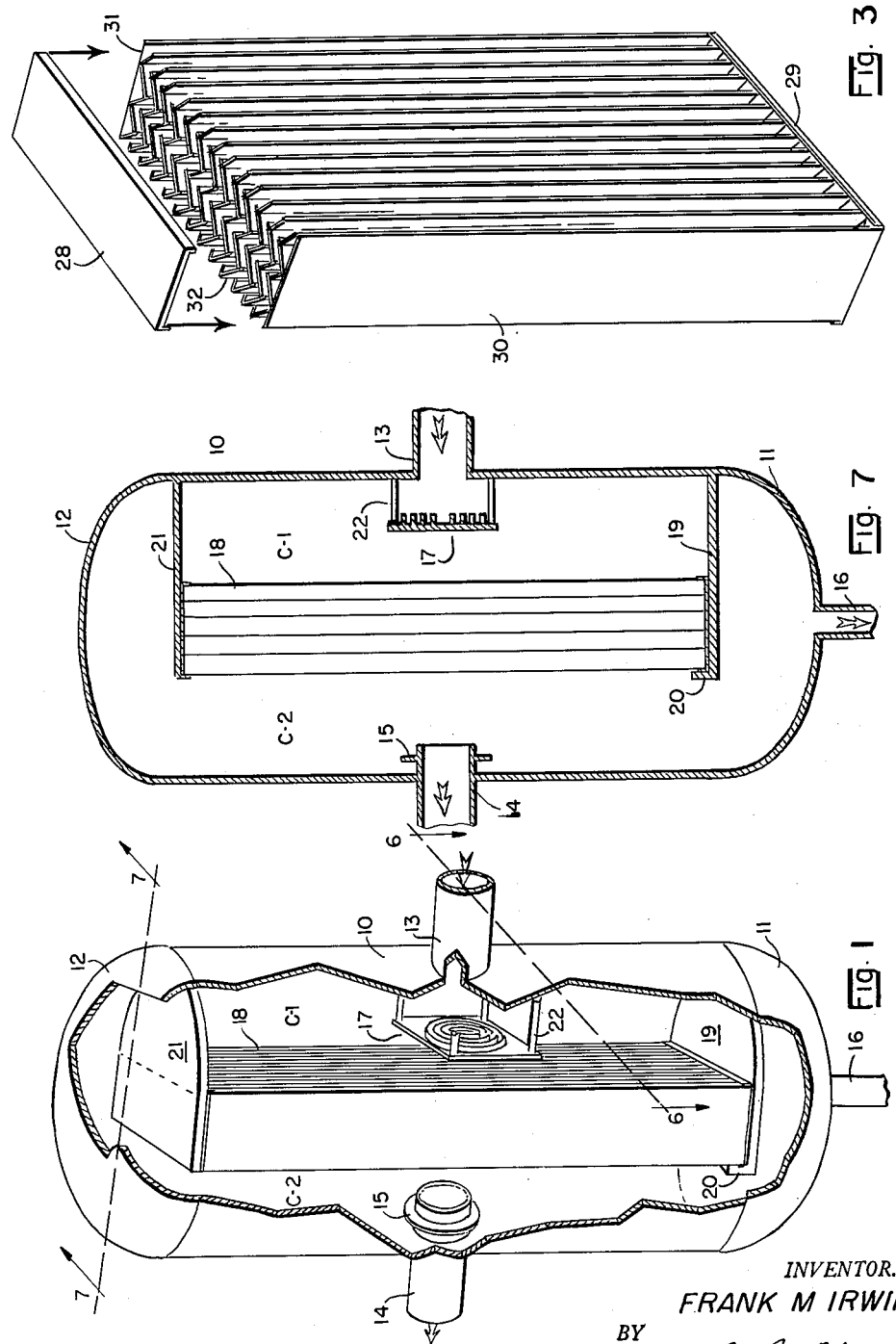
INVENTOR.
FRANK M IRWIN
BY
B. B. Olive
ATTORNEY March 28, 1961   F. M. IRWIN   2,976,954
COMPRESSED AIR PURIFIER
Filed June 4, 1959   2 Sheets-Sheet 2
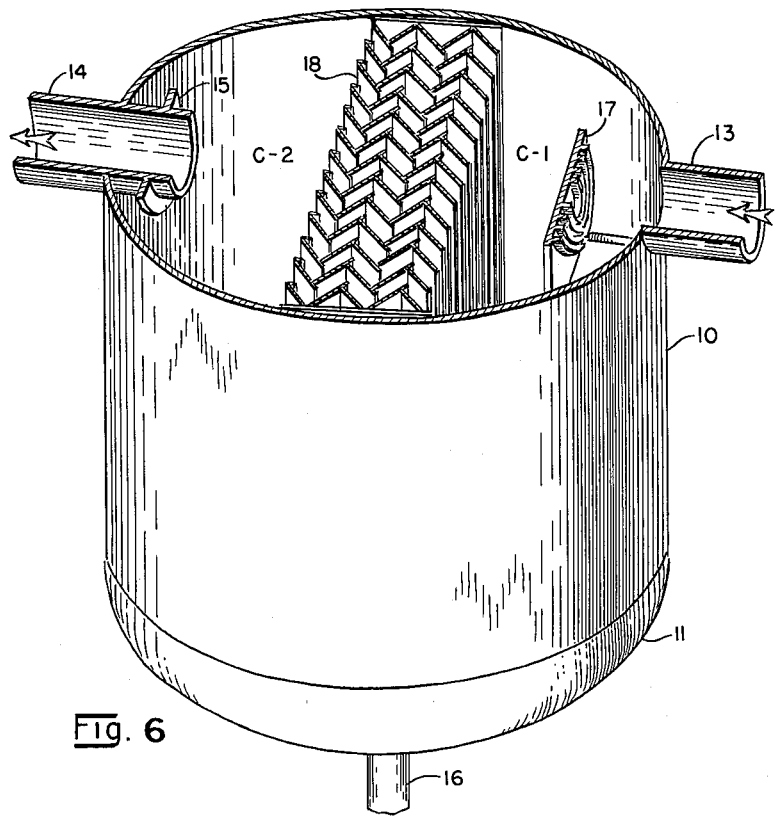
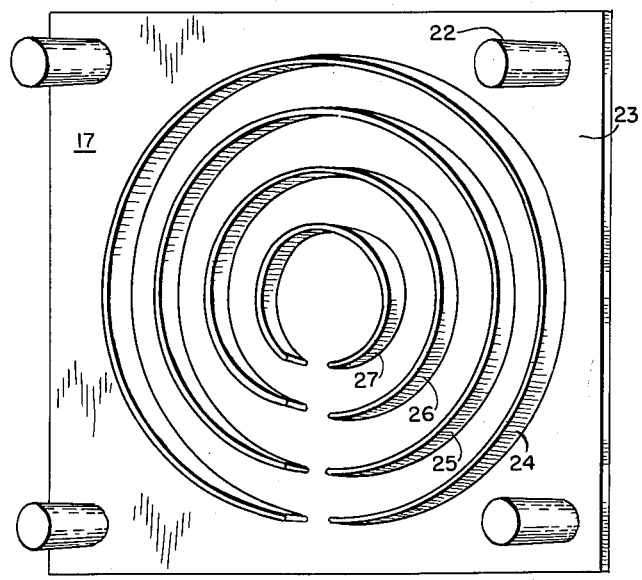
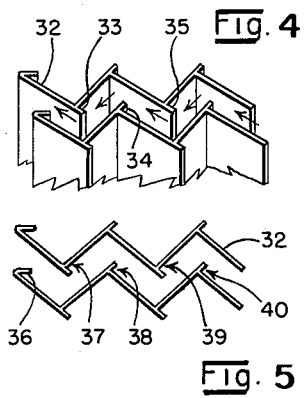
INVENTOR.
FRANK M. IRWIN
BY
B. B. Olive
ATTORNEY Patented Mar. 28, 1961

2,976,954
COMPRESSED AIR PURIFIER

Frank M. Irwin, 4005 Bristol Road, Durham, N.C., assignor of fifty percent to R. Henry Pope, Durham, N.C.

Filed June 4, 1959, Ser. No. 818,082

2 Claims. (Cl. 183—113)

This invention relates to an improved purifier or separator for removing water and oil from compressed air for the purpose of making the air more suitable for manufacturing purposes. More generally, the invention relates to the separation of liquids from gases.

In the invention, the air to be purified is led to a tank and is first directed against an inlet baffle which diffuses the air and turns the flow path ninety degrees and, in addition, through a novel form of construction, acts to release a substantial portion of any liquids entrapped in the air. After leaving the baffle, the air is next directed to a liquid eliminator in which it is passed through a series of short and tortuous paths which relieve it of additional liquids, provision being made for the liquids to be collected and for the purified air to be removed. The eliminator, in addition to being a separator, is physically located within the tank so as to act as a partition between the air inlet and outlets. With the arrangement described, very effective separation may be achieved at relatively low air velocity within the tank itself, such as in the order of twenty feet per minute.

An object of this invention is to provide a separator suitable for installation in a compressed air line and capable of purifying the air of liquids while moving the air at relatively low separation velocity.

A further object is to provide for improved purification of compressed air by means of a separator that lends itself to relatively low velocity separation in the course of which the air being purified is subjected to a series of related motions that tend to whirl, diffuse and rapidly change the direction of the air so as to cause the heavier liquids contained therein to collect on internal walls and the like for removal.

Other objects and advantages of the invention will become apparent from the following detailed description which, when read in conjunction with the drawings, illustrates my invention.

In the drawings,

Fig. 1 is a cutaway view in elevation showing the internal arrangement.

Fig. 2 is an enlargement in perspective of the inlet baffle.

Fig. 3 is an enlargement in perspective of the eliminator.

Fig. 4 is an enlargement in perspective of a pair of the walls as used in the eliminator, showing the plurality of turns in the flow stream.

Fig. 5 is an enlargement in plan of the walls shown in Fig. 4, illustrating how edges are provided in the flow path to entrap the liquids.

Fig. 6 is a horizontal section view taken along the line 6—6 of Fig. 1.

Fig. 7 is a vertical sectional view taken along the line 7—7 of Fig. 1.

Referring to Fig. 1, the separator comprises a vertically positioned pressure type cylindrical tank having a cylindrical body 10, a curved bottom end 11 and a curved top end 12. Leading to the separator is inlet pipe 13, preferably mounted flush with the interior of body 10 and through which passes the air to be purified. Leading from the separator is air outlet pipe 14, which is preferably mounted to extend slightly within body 10 and, on this extended portion within body 10 is mounted a ring flange 15, whose purpose is to discourage the creepage of liquids directly from the interior wall of body 10 into air outlet pipe 14. For the purpose of removing such liquid matter as is separated out, there is provided liquid outlet 16. Outlet 16 may be connected to a suitable discharge valve or automatic trap, the same being well known in the art.

Within the tank, separation of the air and liquids is effected first by an inlet baffle 17 and, secondly, by an eliminator structure 18, the details of which are explained later. In Fig. 1, eliminator 18 is shown mounted on a horizontally positioned semi-circular plate 19 having an upturned edge 20, the curved edge of this plate being joined as by welding to the body 10 interior wall adjacent the line along which body 10 and bottom end 11 are joined. In operation, eliminator 18 rests on plate 19 and against edge 20, the plate 19 acting to support the eliminator 18 and the edge 20 acting to prevent any tendency of the eliminator to turn on the plate. It has not been found necessary actually to connect eliminator 18 to plate 19, though this may be done if desired.

Looking further at Fig. 1, a second horizontally disposed semi-circular plate 21 is shown which, in this instance, is preferably joined as by welding to eliminator 18 and also along its curved edge to the interior wall of body 10. To complete the interior construction, the previously mentioned inlet baffle 17 is installed by supporting the baffle from the interior wall of body 10 by supporting rods 22 joined to the baffle and tank as by welding. Rods 22 are located at each of the corners of baffle 17 and are so placed as to locate baffle 17 centrally opposite inlet pipe 13, so that the influent striking baffle 17 will be turned ninety degrees and diffused over the entire area of the baffle.

With the arrangement described, eliminator 18, when associated with plates 19 and 21, can be seen to be a partition for the body 10 in which an inlet compartment C-1 and an outlet compartment C-2 are established. Thus, all air and liquids, whether light or heavy, are forced to move through eliminator 18 from compartment C-1 to compartment C-2. Any liquids, for example, that collect on plate 19 are directed through eliminator 18 to compartment C-2 for disposition through liquid outlet 16. At the same time, all semi-heavy and light air that remains is also forced through eliminator 18, which compels the entire volume of air passing through the eliminator to be acted on by both baffle 17 as well as eliminator 18, and in relatively rapid succession.

As previously noted, baffle 17 is centrally positioned in front of inlet pipe 13, the axis of inlet pipe 13 being normal to and directed at the center of baffle 17. As can be seen from the drawings, plates 19 and 21 are also so located with respect to each other as to cause the inlet side of eliminator 18 to be normal and centrally disposed with respect to the axis of inlet 13. With such arrangement, the flow over the baffle 17 and through the eliminator 18 continuously includes both the lighter as well as the heavier elements of the air being purified.

One of the important features of the invention lies in the construction of baffle 17 and in Fig. 2 there is shown an enlarged perspective view of this baffle. The baffle comprises a thin, metal, rectangular plate 23, supported from the interior of the body 10 by the supporting rods 22. On the face of plate 23 is a series of concentric metal rings or thin bands 24, 25, 26 and 27. These rings are mounted normal to the face of plate 23 and, at the lower extremity of each, there exists a broken section through which any liquids collected on the rings may pass. These sections are substantially of the same length and are aligned vertically as illustrated in order that liquid collected on the innermost ring 27 may pass through the broken sections aligned below. The outermost ring should be in excess of the inside diameter of inlet pipe 13 in order that all of the influent striking the plate 23 is exposed to the whirling and scrubbing action induced by the ring structure described.

In Fig. 3, an enlarged perspective view of the eliminator is shown as comprising a top wall 28, a bottom wall 29 and side walls 30, 31. For manufacture of the aforesaid walls and other eliminator parts, relatively thin sheet metal construction is preferred. Between the two faces of the eliminator run a series of vertically disposed, thin, laterally spaced, parallel zigzag walls 32. That is, the space between top and bottom walls 28, 29 is divided by walls 32 into a series of relatively narrow zigzag paths having a height equivalent to the spacing between top and bottom walls 28, 29 and a width equivalent to the spacing between the walls 32.

In Fig. 4, I have shown an enlargement of a portion of two of the walls 32 and it will be seen that the air, in moving through eliminator 18, moves in five different directions, having four changes of direction in the course of such travel. It will also be seen that at each turning point, the wall 32 is formed so as to extend into the flow path as represented by edge walls 33, 34, 35, set at an angle to the main walls 32. The purpose of such edge walls is to introduce additional resistance to the flow of the heavier liquid elements of relatively high inertia.

In Fig. 5, I show a plan view of the pair of walls illustrated in Fig. 4 in which V-shaped collecting areas 37, 38, 39, 40 can be seen as being formed by the edge walls mentioned in regard to Fig. 4. In operation, the zigzag direction of the air being purified in itself causes liquid to be collected on the walls 32. However, this separation is greatly enhanced by reason of the edge walls 33, 34, 35 protruding into the path which, in effect, at least temporarily stop the heavier elements in the V-shaped areas 37, 38, 39, 40 and, as the liquids so stopped combine, there is a collection of liquids which pass down the walls 32 on to the bottom wall 19, from which the liquids flow to outlet pipe 16.

Proceeding next to Fig. 6, a horizontal view taken along the line 6—6 of Fig. 1 is shown and in this view it can be seen how eliminator 18 spans the diameter of body 10 so as to divide the tank into the inlet compartment C–1 and the outlet compartment C–2. As previously noted, and as shown in this figure, inlet pipe 13 is installed flush with the interior wall of tank body 10, which causes the entering air to expand immediately upon entering the tank, thus reducing the velocity from that obtaining in the inlet pipe itself. Some of the lighter air of relatively low inertia will bypass baffle 17. However, since baffle 17 is centrally disposed as shown in Fig. 6 and is immediately adjacent the exit of inlet pipe 13, the mixtures of relatively higher inertia will be carried forward and subjected to the diffusing and separating effects of baffle 17. In Fig. 6, there is also seen the arrangement of the zigzag paths in eliminator 18 in respect to the other separating members and it may be mentioned that, as the liquids collect in these paths and fall to the bottom of eliminator 18, such flow of liquids acts as a self-cleaning medium. Further, the presence of such liquids acts through molecular attraction to entrap other liquids coming in contact with them.

In Fig. 7, a sectional elevation view taken along the line 7—7 of Fig. 1 is shown, particularly for the purpose of illustrating how eliminator 18 is supported between the plates 19 and 21 and is associated with such plates to form the inlet compartment C–1 and the outlet compartment C–2. It should be noted that any liquids that collect on the upper surface of plate 19 will move through the bottom of eliminator 18, over the edge 20 and on to the curved bottom end 11 where they are passed out through liquid outlet pipe 16. Fig. 7 also illustrates the action of flange 15, as it can be seen that any liquid attempting to creep down the interior wall of body 10 and directly into air outlet pipe 15 will be prevented from doing so by reason of this flange.

*Operation*

In operation, the entire separator structure is installed in the air line containing the air to be purified. For example, where air is passed through an aftercooler after compression and then to a manufacturing process, the air leaving the aftercooler is apt to be contaminated with various water and oil liquids and the separator would be installed so as to have air inlet 13 receiving air from the aftercooler and air outlet 14 feeding the purified air to the process. With such installation having been made and suitable provision made for removing the separated liquids from liquid outlet 16, the air is led through air inlet 13 where it first strikes baffle 17. Baffle 17 causes a diffusion of the air and, as the relatively heavy liquids and mixtures are entrapped on the baffle rings, they are forced into a kind of whirling, downwardly curved direction and eventually reach an open section of the rings which allows them to fall on to plate 19. Other liquids are forced into separation on the flat areas of plate 23 and these, too, drop to plate 19 when collected in sufficient weight. The remaining air and mixture is directed by the curved sides of body 10 and by the plates 19 and 20 into eliminator 18, where the air is tossed back and forth between the walls 32 and over the edge walls such as 33, 34, 35. This brief but continuous zigzag or back and forth motion, when combined with the scrubbing action induced by the protruding edge walls, causes liquids to collect on the walls 32 and especially in the V-shaped areas 37, 38, 39, 40, where the flow is abruptly stopped. As the liquids so collected begin to flow downwardly, the walls are coated with such liquids and additional liquids still in suspension are collected on the walls through molecular attraction, such molecular attraction contributing to the overall separating effect. Once the liquids reach the bottom wall 29 of the eliminator 18, they are directed into the bottom of outlet chamber C–2 for disposal through liquid outlet 16. As previously mentioned, a principal advantage of the invention lies in the fact that such separation may be effectively carried out with the arrangement described at relatively low separation velocity, thus eliminating the need for any form of high velocity cyclonic type of separation.

Having described my invention, I claim:

1. In a gas and liquid separator adapted for initial and secondary separations, a closed vertical tank having a cylindrical body, top and bottom end walls; a mixture inlet and gas outlet oppositely located in said cylindrical body intermediate of the height thereof; a liquid outlet leading from the bottom of said tank; initial liquid separating baffle means comprising a vertically disposed plate supported from the inside of said tank in front of and normal to the axis of said inlet and having mounted thereon normal to the face thereof and on the side thereof facing said inlet, a series of narrow width laterally spaced bands symmetrically arranged with respect to said inlet and covering an area on said plate in excess of the area of said inlet, each of said bands having an open section in its lower extremity; a secondary liquid separating element located within said tank between said baffle means and gas outlet and comprising a vertical box-like structure having side, top and bottom walls and open front and back faces facing respectively said mixture inlet and gas outlet, said structure side walls being in sealing contact with said cylindrical body, said structure being of the height and width of said cylindrical body at the location of said element and including plate connections between said structure and said cylindrical body arranged to close the space between said cylindrical body and said structure's top and bottom walls on the inlet side thereof whereby the entire cross section of said body is utilized by said element and the entire influent received by said mixture inlet is compelled to flow through said structure, said structure including for secondary separating purposes a plurality of laterally spaced vertically disposed thin walled scrubbing vanes having a plurality of abrupt turns and protruding edges and forming within said structure a series of narrow parallel passageways including said turns and edges between said front and back faces.

2. In a gas and liquid separator as claimed in claim 1 wherein said gas outlet is made in the form of a pipe extending slightly into said cylindrical body and is provided with an outwardly turned flange on the entrance thereto thereby retarding the flow of liquids into said outlet.

References Cited in the file of this patent

UNITED STATES PATENTS

| | | |
|---|---|---|
| 743,388 | Hamphrey | Nov. 3, 1903 |
| 1,531,485 | Lauer | Mar. 31, 1925 |
| 1,928,706 | Sillers | Oct. 3, 1933 |